(No Model.)

H. D. PERKY.
ROLL REDUCING MACHINE FOR PREPARING FOOD.

No. 598,745. Patented Feb. 8, 1898.

WITNESSES
G. M. Anderson
Phil C. Masi.

INVENTOR
H. D. Perky
by E. W. Anderson
his Attorney

United States Patent Office.

HENRY D. PERKY, OF WORCESTER, MASSACHUSETTS.

ROLL REDUCING-MACHINE FOR PREPARING FOOD.

SPECIFICATION forming part of Letters Patent No. 598,745, dated February 8, 1898.

Application filed August 3, 1897. Serial No. 646,969. (No model.)

*To all whom it may concern:*

Be it known that I, HENRY D. PERKY, a citizen of the United States, and a resident of Worcester, in the county of Worcester and State of Massachusetts, have invented certain new and useful Improvements in Roll Reducing-Machines for the Preparation of Food; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
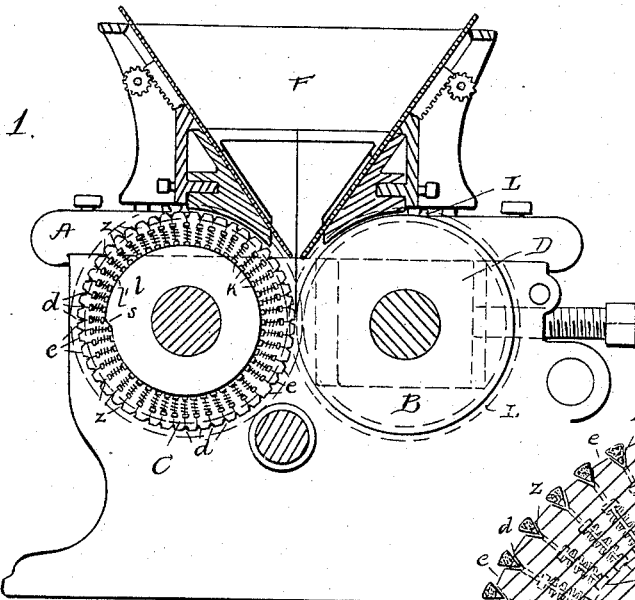
Figure 3:
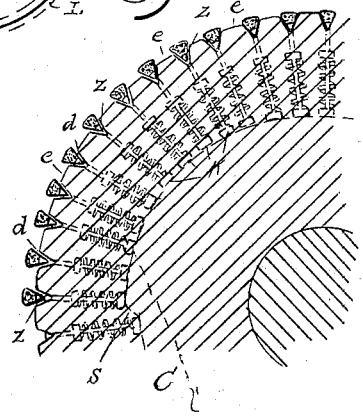
Figure 2:
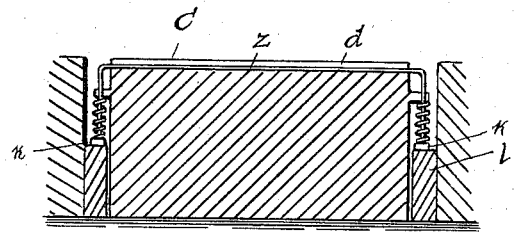
Figure 4:
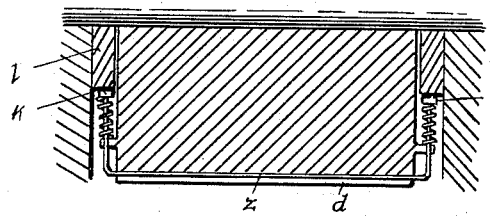
Figure 4:
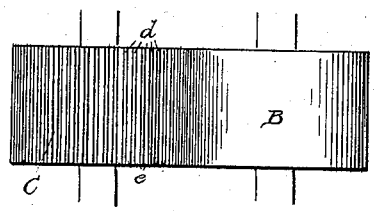

Figure 1 of the drawings is a transverse vertical section through a machine embodying my invention. Fig. 2 is a longitudinal section through the roll C and its bearing. Fig. 3 is a transverse section through a portion of said roll, and Fig. 4 is a plan view of the two rollers removed.

In the present invention I have designed to provide a machine for commingling the exterior coats and gluten layer of the grain-berry with its interior portion or starch, reducing the same to definite form for use as food; and to this end I have devised the following mechanism:

The material upon which it is designed to operate is grain, and especially wheat, which has been duly cleaned and cooked and partially dried in order to bring its exterior and interior portions to an equalized consistency, and yet maintain it in the entire or berry form.

In the accompanying drawings the letter A designates the framework of a machine having bearings for back roll B and the front roll C. These rolls are turned exactly true, and one of them should be provided with box-bearings D for purposes of adjustment, as the rolls are designed to be run in contact with each other. One of the rolls, B, may have a plain cylindrical surface. The other roll, C, is provided with longitudinal grooves $d$ of V form in cross-section, a succession of such straight or longitudinal grooves extending parallel to each other around the roll. The grooves are separated by lands $c$ of the cylindrical surface.

F represents the hopper of the machine, into which the material, being the prepared grain above referred to or shreds of the same produced by machines of proper character, is fed. The rolls being rotated by means of suitable gearing (indicated at L) cause the material to be pressed into the grooves of the roll C, from which it is discharged in the form of strips of definite length in accordance with the width of the roll in the following manner: Fitting neatly in the bottom of each groove is a steel wire or strip of corresponding cross-section, (indicated at $z$,) the ends of which are secured to movable holders $k$. At each side of the grooved roll is attached to the framing a cam-guide $l$, having an eccentric curvature $l'$ sufficient to cause the wire to be protruded from its seat in the bottom of the groove when these curvatures are engaged by the movable holders $k$. The cam-guides are located below the contact-line of the rolls sufficiently to provide for the discharge of the shreds or strips after their formation. The discharging-strips are drawn back to their seats in the grooves by spring action or otherwise. The cams may have slight steps, as indicated at $s$, in order to cause a slight quick movement of the wire $z$ to facilitate its discharging action.

Having thus described my invention, what I claim as new, and desire to secure by Letters Patent, is—

1. The combination with a pair of reducing-rolls journaled to run in neat surface contact with each other, one of said rolls having therein, a series of longitudinal grooves, of a wire or strip movably seated in the bottom of each of said grooves, movable holders to which these wires or strips are attached, and cam-guides engaged by said holders to successively protrude said wires or strips from their seats, together with means for again withdrawing the same, substantially as specified.

2. The combination with a pair of reducing-rolls journaled to run in neat contact with each other, one of the said rolls having therein a series of parallel, longitudinal surface grooves of V form in cross-section, and a feed-hopper arranged to discharge between said rolls, of a wire or strip movably seated in the bottom of each of said grooves, and means whereby the same is momentarily protruded during each rotation of the roll together with means for returning the same to its seat after each protrusion, substantially as specified.

3. The combination of a pair of reducing-rolls, one of which has therein a series of parallel longitudinal grooves, the wires or strips one of which is movably seated in each of the said grooves, the movable holders to which said wires or strips are attached at their end portions, the springs connected to said holders, and the stepped cam-guides engaged by the said holders, substantially as specified.

In testimony whereof I affix my signature in presence of two witnesses.

HENRY D. PERKY.

Witnesses:
SAML. N. ROGERS,
JOHN S. PERKY.